Nov. 12, 1963   W. S. MILLER   3,110,265
GEAR TYPE FLUID HANDLING DEVICE

Filed Aug. 31, 1961   2 Sheets-Sheet 1

INVENTOR.
WENDELL S. MILLER
BY
William P. Green
ATTORNEY

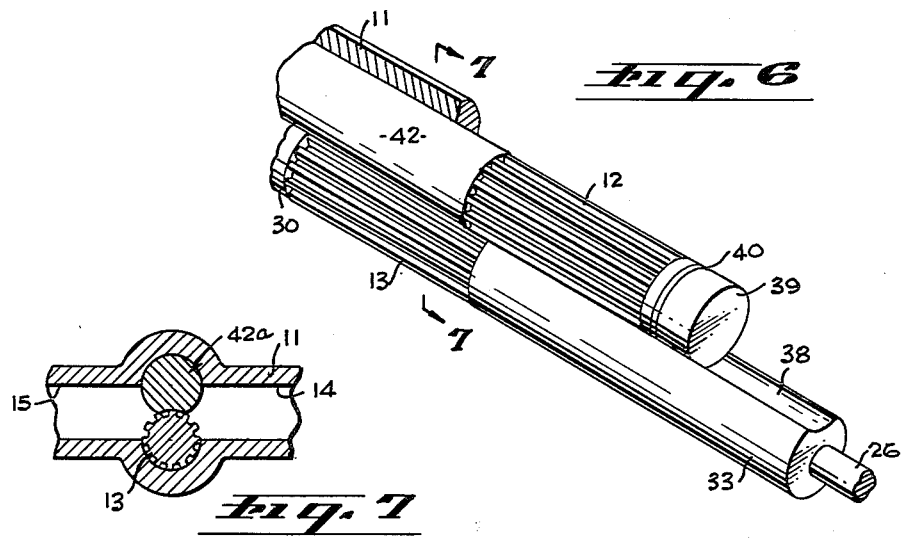
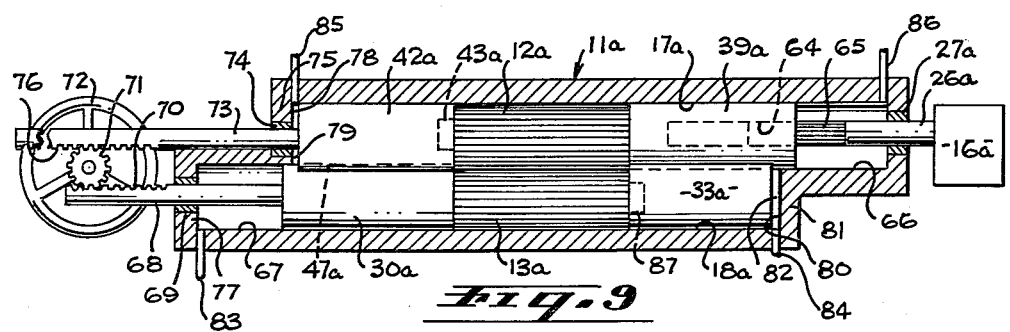
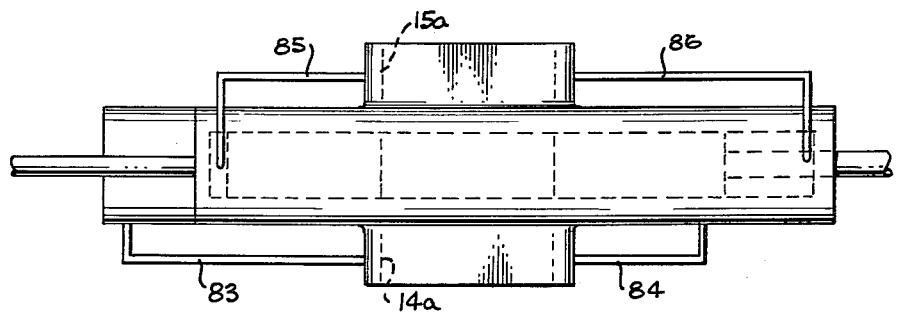

United States Patent Office 3,110,265
Patented Nov. 12, 1963

3,110,265
GEAR TYPE FLUID HANDLING DEVICE
Wendell S. Miller, 1341 Comstock Ave.,
Los Angeles 24, Calif.
Filed Aug. 31, 1961, Ser. No. 135,229
9 Claims. (Cl. 103—120)

This invention relates to certain improvements in gear type fluid handling devices, such as gear pumps or fluid driven gear type motors or metering devices.

Devices embodying the invention are of a general type including a pair of gears mounted in a housing and meshing together in a manner such that fluid, usually liquid but in some instances a gas, flows past the gears and through the housing in accordance with the turning movement of the gears. When the device is to function as a gear motor, the fluid at the inlet side of the device is maintained under pressure and acts to drive the gears. When the device is to function as a pump, on the other hand, the gears are power driven, by an electric motor or the like, and act to pump fluid through the housing as they turn.

One disadvantage which has been inherent in prior gear type devices of this general character has been their inflexibility of operation with respect to the volume of fluid which is passed through the device for each revolution of the gears. This volume has been definitely fixed in prior gear type devices, with the result that where the device has been a motor, the output shaft has necessarily been driven at a certain predetermined rate for a particular rate of fluid flow; and when the device has been a pump, the rate of fluid delivery has been definitely fixed for a particular rate of rotation of the gears.

A major object of the present invention is to provide a gear arrangement in which the volume of fluid passed for each revolution of the gears is not fixed in this manner, but instead can be controllably varied, to render the device considerably more flexible in operation than prior similar motors and pumps. Particularly contemplated is an arrangement in which the volume can be varied continuously through a rather wide operating range, to allow for an infinite number of different rates of fluid output in a pump, and an infinite number of different rates of rotation of the output shaft in a gear motor.

To attain the desired change in volume of fluid passed, I employ an assembly in which at least one of the two meshing gears of the device is mounted for axial shifting movement relative to the other gear. This shifting movement then serves to vary the axial length of the portions of the gears which are in meshing engagement; and since only the portions of the gears which are in mesh at a particular time are effective to pass fluid through the device, the volume of fluid flowing past the gears is changed. Thus, the desired infinite variation in volume of fluid handled is attained.

At the opposite ends of the gears, there are desirably provided special end parts for confining the fluid against gear by-passing flow at those locations. These end parts may be mounted for shifting movement axially with the gears, and are shaped in a unique manner to engage the gears and to engage one another in optimum fluid confining relation.

As one or both of the gears are shifted between different settings, there is a tendency in the present apparatus for a slight increase or decrease in the overall volume of fluid which is contained within the gear space in the housing of the device (between the end parts). Certain additional features have to do with arrangements acting to compensate for this slight change of fluid volume, and in one arrangement effecting this compensation in a manner also overcoming any resistance to shifting of the gears by the fluid.

The above and other features and objects of the present invention will be better understood from the following detailed description of the typical embodiments illustrated in the accompanying drawings in which.

Figure 1:
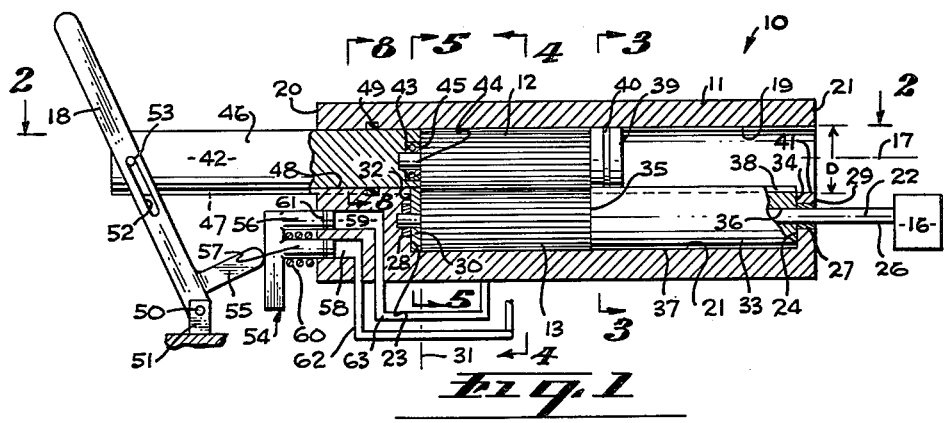
FIG. 1 is a section through a first type of gear pump constructed in accordance with the invention.
Figure 3:
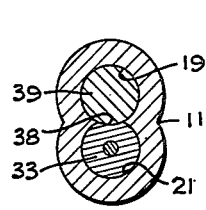
Figure 4:
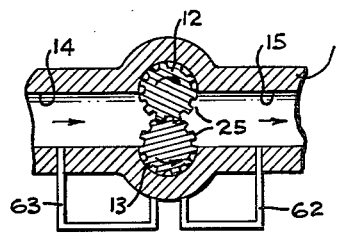
Figure 5:
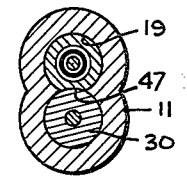
Figure 6:
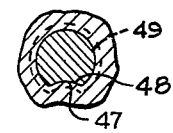

FIGS. 3, 4 and 5 are transverse sections taken on lines 3—3, 4—4 and 5—5 respectively of FIG. 1;

FIG. 6 is a perspective view of stripped pump of the FIG. 1 device, partly in section and showing the gears partially disengaged;

FIG. 7 is a fragmentary section taken on line 7—7 of FIGURE 6;

FIG. 8 is a fragmentary section taken on line 8—8 of FIG. 1;

FIG. 9 is a view similar to FIG. 1, but showing a variational form of device; and FIG. 10 is a plan view of the FIG. 9 unit.

Figure 2:
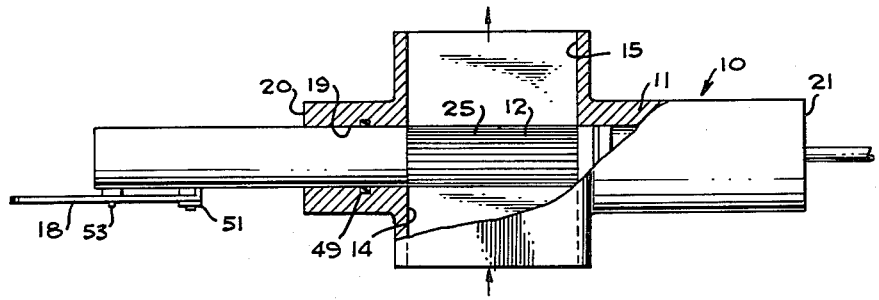
FIG. 2 is a plan view of the FIG. 1 device, shown partially in section on the line 2—2 of FIG. 1.

The gear pump 10 shown in FIGS. 1 through 7 includes an outer housing 11, typically formed of metal or other rigid material, and containing two meshing gears 12 and 13 acting to pump fluid through the housing between an inlet passage 14 and an outlet passage 15 (see FIG. 2). The gears are driven by a motor 16, which may be a constant speed electric motor, with the rate of fluid output of the pump being controlled by axial movement of upper gear 12 along its rotary axis 17. This gear is typically actuated by means of a control lever represented at 18.

Housing 11 contains an upper elongated cylindrical bore centered about axis 17 and extending entirely through the housing from one of its ends 20 to the other end 21. Beneath bore 19 (as viewed in FIG. 1), housing 11 contains a second cylindrical bore 21, typically of the same diameter as bore 19, and centered about a second axis 22 which is parallel to and spaced from axis 17. Bore 21 preferably does not extend through the entire length of housing 11, but instead is closed at opposite ends by end walls 23 and 24 disposed transversely of axis 22. Gears 12 and 13 are mounted rotatably within bores 19 and 21 respectively, for rotation about axes 17 and 22, with the major diameters of the gears being substantially equal to the diameters of the bores (diameter D in FIG. 1). Thus, the gears are very close fits within bores 19 and 21, being only sufficiently smaller than the bores to allow for rotation of the gears about their individual axes. Axes 17 and 22 are spaced apart a distance somewhat less than the diameter D of bores 19 and 21, and in particular sufficiently less than diameter D to allow for full meshing of the teeth 25 of the gears. Thus, the cylinders defined by the inner surfaces of bores 19 and 21 intersect one another at the locations at which the two gears mesh together. In the illustrated arrangement, the teeth 25 of the gears are represented as extending directly axially along the outer surfaces of the gears.

Motor 16 rotatably drives a shaft 26 which is journaled for rotation about axis 22 by bearings 27 and 28. This shaft extends through end wall 29 of the housing, and entirely through gear 13, and is rotatably keyed to the gear to drive it and the meshing gear 12 in accordance with the powered rotation of shaft 26. To the left of gear 13, as viewed in FIG. 1, this gear integrally or rigidly carries a short externally cylindrical element 30, of a diameter corresponding to bore 21, to fit closely within that bore. In the simplest arrangement, this element 30 is merely an externally cylindrical extension of the same piece of metal from which gear 13 is formed, with the gear teeth terminating in the transverse plane represented at 31 in FIG. 1. The outer end surface 32 of element 30 is disposed transversely of axis 22, and annularly engages the previously mentioned transverse end wall surface formed by the housing.

At the opposite end of gear 13, there is provided an elongated end element 33, having a transverse end surface 34 engaging housing surface 24. At 35, gear 13 and element 33 have annular surfaces abutting against one another and disposed transversely of axis 22. Internally, element 33 has a bore 36 through which shaft 26 extends in closely fitting relation. Externally, element 33 has a cylindrical surface 37 which is a close fit within bore 21, and which is circularly continuous about axis 22 except at the location of an upper recess 38 formed in element 33.

The upper gear 12 may be essentially identical with lower gear 13, except that it does not have the extension 30 at the left end of the gear, but instead has a generally similar short externally cylindrical extension 39 formed at the right end of gear 12 (as viewed in FIG. 1). This extension 39 may be integral with gear 12, and of a diameter corresponding approximately to, but rotatable within, bore 19, with an O-ring 40 of rubber or other sealing material received within a groove in extension 39 and engaging bore 19 in fluid sealing relation. The upper groove 38 formed in element 33 is a partial cylindrical groove, centered arcuately about upper axis 17, and thereby forming in effect a continuation of upper bore 19, so that bore 19 and groove 38 form together a circularly continuous cylindrical bore engaged by element 39 and seal ring 40 in fluid-tight relation. Beyond the end of element 33, at the location of housing wall 29, the bore 19 may be circularly continuous, even at the location of a bottom portion 41 thereof aligned with groove 38.

At its left end, gear 12 is rotatably connected to an elongated end piece and shifting member 42, containing a bore adjacent the gear within which a bearing 43 is received. Gear 12 may have an integral shaft 44 extending along axis 17, and journalled by bearing 43 to allow rotation of gear 12 relative to element 42. Bearing 43 is of a type acting as a thrust bearing to hold gear 12 in fixed axial position relative to element 42, so that axial shifting movement of element 42 serves to correspondingly shift gear 12 and its connected end part 39. About bearing 43, elements 12 and 42 have transverse surfaces in abutting engagement at 45. As seen in FIG. 5, element 42 has a transverse cross-section corresponding to that of the previously discussed end piece 33. More particularly, element 42 has an external cylindrical surface 46 of a diameter corresponding substantially to that of bore 19, and extending entirely about and along element 42 except at the location of a bottom arcuate groove 47 similar to groove 38 in part 33. Groove 47 is cylindrically or arcuately curved to form a continuation of bottom bore 21, and to thereby closely engage the upper surfaces of element 30 and gear 13 in different settings of the upper gear. To the left of element 30, between the location of that element and end surface 20 of the housing, the cross-section of bore 19 is altered slightly, to the extent of providing an arcuate partial cylindrical surface 48 projecting upwardly into bore 19 and centered about lower axis 22. This surface 48 thus forms a leftward continuation of the upper portion of element 30, and mates with recess 47 formed in element 42. A seal ring 49 may be received within a groove formed in housing 11 about part 42, to peripherally engage part 42 and form a fluid seal between that part and the housing.

Part 42 is actuated axially by means of lever 18, which is pivoted at 50 to a stationary support 51, and which has a slot 52 within which a pin 53 projecting laterally from part 42 is received. As will be apparent, as lever 18 is swung to the right as viewed in FIG. 1, the pin and slot connections 52—53 correspondingly shifts element 42 and gear 12 to the right within housing 11. In addition, this swinging movement of lever 18 displaces a part 54 to the right relative to the housing, by virtue of engagement of a finger 55 on lever 18 with part 54. The part 54 integrally carries two piston or plunger elements 56 and 57, which elements are slidably received within coacting bores or cylinders 58 and 59 in housing 11 for movement parallel to axes 17 and 22. Part 54 may be yieldingly urged to the left by a coil spring represented at 60, and the two plungers may be sealed with respect to their corresponding bores by O-rings 61. Bores 58 and 59 are placed in communication with inlet passage 14 and outlet passage 15 respectively by conduits 62 and 63. The inlet and outlet passages 14 and 15 desirably have a length corresponding to the axial length of the gears (see FIG. 2), and are located directly opposite the gears, in the full mesh FIG. 1 setting of the gears.

To now describe the manner of operation of the device of FIGS. 1 through 8, assume first of all that the apparatus is in the setting of FIG. 1, and that motor 16 is electrically energized to continuously turn shaft 26 and the two gears 12 and 13. Upper gear 12 turns in a clockwise direction as viewed in FIG. 4, and lower gear 13 turns in a counterclockwise direction. As the gears turn in these directions, the teeth 25 of the gears progressively pump fluid from right to left along the upper side of gear 12, and along the lower side of gear 13. The full meshing interengagement of the gears at the bottom of gear 12 and the top of gear 13 prevents a reverse flow of the fluid at that location. Thus, the device pumps fluid from inlet passage 14 to outlet passage 15 at a rate dependent upon the rate of rotation of shaft 26.

If it is now desired to reduce the output of the pump, while maintaining the same rate of rotation of the gears, lever 18 is shifted to the right as viewed in FIG. 1, as to the position represented in FIG. 6, so that a right hand portion of upper gear 12 is moved out of engagement with lower gear 13, and moves into arcuate recess 38 formed in part 33. Similarly, a left hand portion of gear 13 is now received within a portion of bottom groove 47 formed in element 42. In this condition, the only effective pumping portions of the gears are those portions which remain in mesh with one another. The portion of each gear which is not in mesh with the other gear, for example the portion of gear 13 shown in FIG. 7, acts merely to pump fluid around in a circle, with the same amount of fluid being pumped from outlet 15 to inlet 14 as is pumped in the opposite direction from inlet 14 to outlet 15. Element 42 may be shifted continuously through an infinite number of positions from the FIG. 1 maximum flow setting to a zero flow setting just beyond that of FIG. 6 and in which no portions of the two gears are in mesh.

As upper gear 12 of FIG. 1 is shifted to the right, and the gears move partially out of mesh, the total volume of fluid which can be contained within the housing at the locations of the gears, between end parts 30 and 33, and between end parts 39 and 42, increases progressively as a result of the movement of the gears out of mesh. To compensate for this effect, pistons 56 and 57 pump small charges of fluid into the inlet and outlet sides of the device in accordance with such rightward movement of gear 12. The plungers or pistons 56 and 57, and their bores 58 and 59, are so dimensioned as to exactly compensate for the effect discussed, and thereby avoid any overall pumping of fluid into or out of the device 10, solely in response to axial shifting movement of gear 12 and its associated parts. This compensation is especially desirable where the fluid being handled is a liquid and is therefore incompressible.

If it is desired to utilize the unit 10 of FIGS. 1 through 8 as a fluid actuated motor, rather than as a gear pump, then fluid under pressure is supplied to inlet passage 14, and acts to drive gears 12 and 13 in the directions illustrated in FIG. 4. The unit represented at 16 in FIG. 1 may then be considered as a device to be driven by the fluid actuated gear motor 10. The rotation of the gears drives shaft 26, which in turn drives the actuated unit 16.

FIGS. 9 and 10 show another form of the invention, which is very similar to that of FIGS. 1 through 8 except in the respects specifically discussed below. Housing 11a of the FIGS. 9 and 10 device contains two cylindrical bores 17a and 18a, within which gears 12a and 13a are slidably received. Gear 12a has at its right end an externally cylindrical extension 39a corresponding to that shown at 39 in FIG. 1, except that extension 39a is longer axially than part 39, and contains a splined bore 64 within which a splined end 65 of motor driven shaft 26a is received. Shaft 26a extends through a bushing 27a carried by the housing, in fluid sealing relation, so that a closed end compartment 66 is formed within the housing axially beyond the portion 39a of the upper gear assembly. As will be apparent, the splined connection 64—65 allows motor 16a to continuously drive element 39a and the connected gear 12a, while at the same time permitting axial movement of parts 12a and 39a.

As in the case of the upper gear, the cylindrical extension 30a of lower gear 13a is considerably longer in FIG. 9 than was the corresponding part 30 in FIG. 1, and forms an end compartment 67 within the end portion of the housing. A shaft or rod 68 projects from element 30a through a sealing bushing 69, and has rack teeth 70 formed on its upper surface for engagement with a pinion 71, to actuate elements 13a and 30a axially within the housing. A hand operated wheel 72 may be connected to pinion 71, for turning it.

At the left end of upper gear 12a there is provided a part 42a, which may be considered to be essentially identical with part 42 of FIG. 1, the gear being connected thereto by bearing 43a so that parts 12a and 42a move axially together, with gear 12a being rotatable relative to part 42a. Connected to part 42a, there is a rod or shaft 73, which projects through a sealing bushing 74 within an end wall 75 of the housing, and has rack teeth 76 at its underside for engagement with pinion 71.

To the right of gear 13a, there is provided a part 33a which may be essentially the same as part 33 of FIG. 1, except that part 33a is axially movable with parts 13a and 30a, and in order to allow for such movement of part 33a, elements 13a and 33a are connected together by a thrust bearing 87 of the same type provided at 43a. Part 33a has an upper partial cylindrical groove 38a within which elements 12a and 39a are receivable, and part 42a has a similar downwardly facing partial cylindrical groove 47a within which parts 13a and 30a are receivable. It is noted that end wall 75 of the housing is offset sufficiently far to the right of end wall 77 to allow part 30a in all settings to project beyond the inner surface 78 of end wall 75, and thus isolate chamber 67 from a chamber 79 provided between end wall 75 and element 42a. Similarly, at the opposite end of the device, part 39a projects in all settings beyond transverse surface 80 of end wall 81, to form a chamber or compartment 82 at the right end of element 33a, which chamber is in all conditions isolated from compartment 66. The two compartments 67 and 80 at opposite ends of the lower gear assembly are both placed in communication with inlet passage 14a (and therefore with one another) by conduits 83 and 84; and similarly the two compartments 66 and 79 at opposite ends of the upper gear assembly are placed in communication with discharge passage 15a (and with one another) through conduits 85 and 86.

In describing the operation of the device of FIGS. 9 and 10, assume that motor 16a is turning at a uniform rate of speed, and that gears 12a and 13a are initially in their fully meshed positions of FIG. 9. In this condition, the gears act in the same manner previously discussed in connection with the first form of the invention to pump fluid from inlet passage 14a to discharge passage 15a. If it is desired to reduce the rate of output, while still maintaining the same rate of rotation of the gears, handle 72 and its connected pinion 71 are turned in a direction to move upper gear 12a and its connected parts 39a and 42a to the right, while simultaneously moving roller gear 13a and its connected parts 30a and 33a to the left a corresponding distance. Thus, portions of the gears move out of mesh, and the effective axial lengths of the gears for pumping purposes therefore decrease, with resultant corresponding reduction in the pumping rate. The intercommunication provided between chambers 67 and 80, and the inlet passage 14a, through conduits 83 and 84, allows fluid from chamber 67 to flow into chamber 82 upon leftward movement of the lower gear assembly, and also compensates for the slight increase in fluid receiving volume at the location of gear 13a, which slight change in volume was compensated for by piston 57 in FIG. 1. Similarly, the intercommunication between chambers 66 and 79, and discharge passage 15a, allows fluid flow between these chambers, and compensates for the slight change in volume at the discharge side of the unit.

I claim:

1. A gear type fluid handling device comprising a housing, and two gears in said housing having teeth meshing at a predetermined location and constructed to pass fluid from an inlet side of the gears to a discharge side thereof in accordance with the rate of rotation of the gears, both of said gears being shiftable axially in the housing and relative to one another and being operable by such shifting movement to vary the effective volume of fluid which flows past the gears from said inlet side to said discharge side upon each revolution of the gears, said gears being shiftable to a partially meshed position in which first portions of the gears are in axially overlapping meshing relation, but in which an end portion of each gear projects axially beyond the other gear, out of mesh therewith, and has the entire space between its teeth filled with fluid.

2. A gear type fluid handling device as recited in claim 1, including control means operable to simultaneously shift said two gears in opposite axial directions.

3. A gear type fluid handling device comprising a housing, two gears in said housing having teeth meshing at a predetermined location and constructed to pass fluid from an inlet side of the gears to a discharge side thereof in accordance with the rate of rotation of the gears, both of said gears being shiftable axially within the housing and relative to one another and being operable by such shifting movement to vary the effective volume of fluid which flows past the gears from said inlet side to said discharge side upon each revolution of the gears, two pairs of end parts associated with said two gears respectively, the two end parts of each of said pairs being received at opposite ends of the associated gear and being movable axially therewith, said housing forming two end compartments at opposite ends of a first of said gears and axially beyond the two end parts associated therewith, said housing forming two additional end compartments at opposite ends of the second gear and axially beyond the two end parts associated therewith and isolated from said first mentioned end compartments, means placing said first mentioned end compartments in communication with one another and with one of said inlet and discharge sides of the gears, and means placing said additional end compartments in communication with one another and with the other of said sides of the gears.

4. A gear type fluid handling device as recited in claim 3, in which said housing contains two parallel bores containing said gears respectively and their end parts and forming said end compartments at opposite ends of the bores, one of said bores projecting beyond the other at one end, and said other bore projecting beyond said one bore at the second end of the bores.

5. A gear type fluid handling device comprising a housing, two gears in said housing having teeth meshing at a predetermined location and constructed to pass fluid from an inlet side of the gears to a discharge side thereof in accordance with the rate of rotation of the gears, at least one of said gears being shiftable axially in the housing and relative to the other gear and being operable by such shifting movement to vary the effective volume of fluid which flows past the gears from said inlet side to said discharge side upon each revolution of the gears, compensating means for feeding small amounts of fluid to both of said inlet and discharge sides of the gears in response to relative axial shifting movement of said gears to compensate for the change in fluid capacity at said sides resulting from said shifting movement, and means for conducting fluid from said compensating means to both of said inlet and discharge sides of the gears.

6. A gear type fluid handling device comprising a housing, two gears in said housing having teeth meshing at a predetermined location and constructed to pass fluid from an inlet side of the gears to a discharge side thereof in accordance with the rate of rotation of the gears, at least one of said gears being shiftable axially in the housing and relative to the other gear and being operable by such shifting movement to vary the effective volume of fluid which flows past the gears from said inlet side to said discharge side upon each revolution of the gears, two compensating pumping units for pumping small amounts of fluid to both of said inlet and discharge sides of the gears in response to relative axial shifting movement of said gears in quantities to compensate for the change in fluid capacities at said sides resulting from said shifting movement, means for conducting fluid from said pumping units respectively to said inlet and discharge sides of the gears, and means for actuating said pumping units in correspondence with the relative shifting movement of said gears.

7. A gear type fluid handling device comprising a housnig, two gears in said housing having teeth meshing at a predetermined location and constructed to pass fluid from an inlet side of the gears to a discharge side thereof in accordance with the rate of rotation of the gears, at least one of said gears being shiftable axially in the housing and relative to the other gear and being operable by such shifting movement to vary the effective volume of fluid which flows pass the gears from said inlet side to said discharge side upon each revolution of the gears, two compensating piston and cylinder pumping units for pumping small amounts of fluid to both of said inlet and discharge sides of the gears in response to relative axial shifting movement of said gears in quantities to compensate for the change in fluid capacities at said sides resulting from said shifting movement, means for conducting fluid from said piston and cylinder pumping units respectively to said inlet and discharge sides of the gears, and means for actuating said piston and cylinder pumping units in correspondence with the relative shifting movement of said gears.

8. A gear type fluid handling device comprising a housing, two gears in said housing having teeth meshing at a predetermined location and constructed to pass fluid from an inlet side of the gears to a discharge side thereof in accordance with the rate of rotation of the gears, at least one of said gears being shiftable axially in the housing and relative to the other gear and being operable by such shifting movement to vary the effective volume of fluid which flows past the gears from said inlet side to said discharge side upon each revolution of the gears, two compensating pumping units for pumping small amounts of fluid to both of said inlet and discharge sides of the gears in response to relative axial shifting movement of said gears in quantities to compensate for the change in fluid capacities at said sides resulting from said shifting movement, means for conducting fluid from said pumping units respectively to said inlet and discharge sides of the gears, actuating mechanism for relatively axially shifting said gears, and mechanism operated by said actuating mechanism for operating said piston and cylinder pumping units in correspondence with the relative shifting movement of said gears.

9. A gear type fluid handling device comprising a housing, two gears in said housing having teeth meshing at a predetermined location and constructed to pass fluid from an inlet side of the gears to a discharge side thereof in accordance with the rate of rotation of the gears, both of said gears being shiftable axially in the housing and relative to one another and being operable by such shifting movement to vary the effective volume of fluid which flows past the gears from said inlet side to said discharge side upon each revolution of the gears, and compensating means for feeding small amounts of fluid to both of said inlet and discharge sides of the gears in response to relative axial shifting movement of said gears to compensate for the change in fluid capacity at said sides resulting from said shifting movement, said compensating means including means forming a first pair of end compartments at opposite ends of one of said gears and varying in size upon axial movement of the gears, means forming a second pair of end compartments at opposite ends of the other gear and varying in size as the gears shift and isolated from communication with said first pair of compartments, means connecting said first pair of said compartments to the inlet side of said gears, and means connecting the second pair of compartments to the discharge side of said gears.

References Cited in the file of this patent

UNITED STATES PATENTS

| | | |
|---|---|---|
| 543,872 | Kendall | Aug. 6, 1895 |
| 549,854 | Norman | Nov. 12, 1895 |
| 711,662 | Herdman | Oct. 21, 1902 |
| 788,848 | Riegel | May 2, 1905 |
| 1,223,734 | Rinehart | Apr. 24, 1917 |
| 2,052,419 | Moore et al. | Aug. 25, 1936 |
| 2,293,126 | Fersing | Aug. 18, 1942 |
| 2,368,789 | Tucker | Feb. 6, 1945 |
| 2,570,411 | Vickers | Oct. 9, 1951 |
| 2,684,636 | Heldenbrand | July 27, 1954 |
| 2,804,016 | Moore | Aug. 27, 1957 |
| 2,955,541 | Moore | Oct. 11, 1960 |